Patented Nov. 17, 1936

2,061,509

UNITED STATES PATENT OFFICE 2,061,509

IMPREGNATED ARTICLE

William W. De Laney, Marshallton, Del., assignor to Hercules Powder Company, Wilmington, Del., a corporation of Delaware No Drawing. Application April 2, 1935, Serial No. 14,379

25 Claims. (Cl. 91—68)

This invention relates to an improvement in impregnated articles and more specifically to box toes for shoes.

Impregnated articles in accordance with this invention may have various forms and will be characterized by a light color, if a light colored base material is used, by toughness, strength, by freedom from spontaneous oxidation on storage and from dusting out of the impregnating composition.

Articles in accordance with this invention will comprise a base which will be absorptive and may comprise any desired absorptive material, as a felt, a woven fabric, or the like, impregnated with a composition comprising essentially a chlorine-containing compound of rubber, by which I mean and intend to include chlorinated rubber, rubber hydrochloride, chlorinated rubber hydrochloride, etc., and a resin, and with which may be included a plasticizer and/or other ingredients which may be desirable for the ultimate purpose for which the article is intended.

In the practical adaptation of this invention, impregnated articles, such as box toes for shoes, will be prepared, for example, by effecting saturation of the base selected with, for example, a solution of the composition described, in a solvent or solvent mixture, and drying, preferably at an elevated temperature. Where the article is to have some definite shape or form, as a box toe, the saturated base may be shaped or formed and then dried, or if the material has been previously dried, it may be softened with heat and then formed, or it may be softened by the addition of solvent, formed or shaped and dried.

The composition for impregnation of the base may contain a chlorine-containing compound of rubber, as chlorinated rubber, rubber hydrochloride, chlorinated rubber hydrochloride, etc. of widely varying chlorine content and of widely varying viscosity and produced by any well known or desired procedure involving the treatment with chlorine, treatment with hydrochloric acid or treatment with hydrochloric acid and then with chlorine, of vulcanized, unvulcanized, or reclaimed rubber, latex, gutta percha, balata, and the like.

Thus, for example, the chlorine-containing rubber compound may have a viscosity of, for example, 30–1,000 centipoises, in 20% solution in toluol, and may have a total chlorine content in the form of HCl and/or $Cl_2$ of, for example, 40%–75%. More specifically, the several chlorine-containing rubber compounds may contain chlorine in the form of HCl and/or $Cl_2$, for example, in the amounts shown in the following table:

|  | Per cent |
|---|---|
| Chlorinated rubber hydrochloride—chlorine content range | 50–67 |
| Chlorinated rubber hydrochloride—chlorine content range | 40–50 |
| Chlorinated rubber hydrochloride—chlorine content range | 36–40 |
| Rubber hydrochloride—chlorine content range | 20–32 |
| Chlorinated rubber — chlorine content range | 40–75 |

The chlorine-containing rubber compounds may be used in widely varying amounts, for example, in amount of 10%–90%, preferably 40%–80%, by weight of the non-volatile portion of a solution, depending upon the particular compound used and its content of chlorine as HCl and/or $Cl_2$.

The resin may be any of the usual resins, such as, for example, rosin, dammar gum, ester gum, Nevendine gum, Vinylite resin, Amerol resin, or the like, or mixtures thereof, etc. Variously the resins, as rosin and ester gum, may be hydrogenated, if desired. The resin may be used in widely varying proportion, say, for example, in amount of 10%–70% by weight of the non-volatile portion of a solution.

Where a plasticizer is used, such may be any suitable plasticizer, as, for example, castor oil, dibutyl phthalate, tricresyl phosphate, ethyl and methyl abietates, hydrogenated ethyl and methyl abietates, pine oil foots, polymerized terpenes, and the like, etc. The plasticizer may be used in widely varying proportion say, for example, in amount of 1%–25% by weight of the non-volatile portion.

Ingredients other than chlorinated rubber, resin and plasticizer may be included, if desired, to give to the ultimate article desired characteristics.

Various solvents for the composition and in various amounts may be used. Thus, for example, a suitable solvent may comprise ethylene dichloride, ethyl acetate, benzol, toluol, carbon tetrachloride, carbon disulphide, and mixtures thereof, and, in fact, any low boiling solvent for chlorinated rubber and the added ingredients. The solvent may be used in widely varying proportions, preferably to the amount of 35%–70% by weight of the impregnating solution, depending upon the viscosity necessary for proper impregnation, and the character of the final product desired.

As illustrative, for example, compositions in accordance with the formulae in the following tables will be found efficient for use in the production of impregnated articles in accordance with this invention:

Table A

| | Parts by weight | | | | | |
|---|---|---|---|---|---|---|
| | 1 | 2 | 3 | 4 | 5 | 6 |
| Chlorinated rubber (for example 66% Cl₂) or chlorinated rubber hydrochloride (for example 50% to 67% chlorine) | 50 | 50 | 50 | 50 | 50 | 50 |
| Rosin | 112 | 112 | 80 | 50 | 112 | 112 |
| Ethylene dichloride | 170 | | | | | |
| Ethyl acetate | | 150 | 150 | 150 | 150 | 150 |
| Dibutyl phthalate | | | 5 | 5 | 5 | |
| Hydrogenated Methyl abietate | | | | | 10 | 5 |

Table B

| | Parts by weight | | | | | | |
|---|---|---|---|---|---|---|---|
| | 1 | 2 | 3 | 4 | 5 | 6 | 7 |
| Chlorinated rubber (for example 66% Cl₂) or chlorinated rubber hydrochloride (for example 50% to 67% chlorine) | 50 | 50 | 50 | 50 | 50 | 50 | 50 |
| Ethyl acetate | 150 | 150 | 150 | 150 | 150 | 150 | 75 |
| Benzol | | | | | 30 | | |
| Acetone | | | | | | | 75 |
| Raw castor oil | 10 | | | | | | |
| Tricresyl phosphate | | 5 | | | | | |
| Dibutyl phthalate | | | 5 | 5 | 5 | 5 | |
| Rosin | 56 | 56 | | | | | 56 |
| Ester gum | | | 56 | | | | |
| Amberol resin | | | | 56 | | | |
| Dammar gum | | | | | 56 | | |
| Nevendine gum | | | | | | 56 | |
| Vinylite resin | | | | | | | 25 |

Table C

| | Parts by weight | | | | | | | |
|---|---|---|---|---|---|---|---|---|
| | 1 | 2 | 3 | 4 | 5 | 6 | 7 | 8 |
| Chlorinated rubber hydrochloride (60% Cl₂) | 40 | 40 | 40 | 40 | 40 | | 23 | |
| Chlorinated rubber hydrochloride (45% Cl₂) | | | | | | 40 | | |
| Chlorinated rubber hydrochloride (38% Cl₂) | | | | | | | 1.7 | 17 |
| Chlorinated rubber (60% Cl₂) | | | | | | | | 23 |
| Rosin | 160 | 160 | 160 | 160 | 160 | 160 | 160 | 160 |
| Soft coumarone | 40 | 20 | 20 | 20 | 20 | | | |
| Dibutyl phthalate | | | 10 | | | | | |
| Butyl stearate | | | | 10 | | | | |
| Tricresyl phosphate | | | | | 10 | | | |
| Hydrogenated methyl abietate | | | | | | 10 | | |
| Benzol | 160 | 160 | 160 | 160 | 160 | 160 | 160 | 160 |

In the above formulae the chlorine-containing rubber compounds may have varying chlorine content in the form of HCl and/or Cl₂ over those indicated and may have any desired viscosity. As will be appreciated, the above formulae are given for illustrative purposes and not by way of limitation.

In general, it will be found that chlorinated rubber hydrochloride containing total chlorine within about the range 40%–50% will be softer than chlorinated rubber hydrochloride containing total chlorine within about the range 50%–67% and hence the former will be satisfactory for the production of box toes with use of less plasticizer than is desirably used with the latter. Again, chlorinated rubber hydrochloride containing total chlorine within about the range 36%–40% will be found to be quite soft and may be used without plasticizer, if desired, and, indeed, may be used to plasticize or soften the less soft chlorinated rubber hydrochloride of higher total chlorine content and when so used will be and will function as a plasticizer.

Variously compositions including mixtures of the several chlorine-containing rubber compounds, with or without other ingredients, as plasticizers, gums, resins, etc., may be used in the production of box toes in accordance with this invention.

In the production of impregnated articles in accordance with this invention the base, for example, a felt, will be saturated with a solution according, for example, to one or another of the above formulae and then dried to eliminate the solvent. The elimination of the solvent may be accomplished in any desired manner, but preferably will be effected by drying in a current of air at an elevated temperature, say at a temperature of about 200° F.–230° F.

In the production of box toes for shoes in accordance with this invention, suitable blanks of felt saturated with a solution, according, for example, to one or another of the above formulae, and partially dried, will be lasted into a shoe and then finally dried, or the box toe blanks may be cut from an impregnated sheet and formed after softening of the sheet by the application of solvent thereto, with subsequent elimination of the solvent.

In general, however, it will be found to be more simple and satisfactory, since the impregnating composition will have thermoplastic properties, to shape the impregnated articles in accordance with this invention by softening them by the application of heat.

It will be understood that where in the claims appended hereto the term chlorine-containing rubber compound is used that such is intended to include chlorinated rubber, rubber hydrochloride and chlorinated rubber hydrochloride and that it is intended that chlorine-containing compounds of gutta percha, balata, and the like, are contemplated as equivalents for chlorine-containing rubber compounds.

This application is a continuation in part of my application for United States Patent, Serial No. 690,572, filed September 22, 1933.

What I claim and desire to protect by Letters Patent is:

1. A box toe for shoes comprising an absorptive base impregnated with a chlorine-containing rubber compound and a resin.

2. A box toe for shoes comprising an absorptive base impregnated with a chlorine-containing rubber compound and a plasticizer.

3. A box toe for shoes comprising an absorptive base impregnated with a chlorine-containing rubber compound, a resin and a plasticizer.

4. A box toe for shoes comprising an absorptive base impregnated with rubber hydrochloride and a resin.

5. A box toe for shoes comprising an absorptive base impregnated with rubber hydrochloride and a plasticizer.

6. A box toe for shoes comprising an absorptive base impregnated with rubber hydrochloride, a resin and a plasticizer.

7. A box toe for shoes comprising an absorptive base impregnated with chlorinated rubber hydrochloride and a resin.

8. A box toe for shoes comprising an absorptive base impregnated with chlorinated rubber hydrochloride and a plasticizer.

9. A box toe for shoes comprising an absorptive base impregnated with chlorinated rubber hydrochloride, a resin and a plasticizer.

10. A box toe for shoes comprising an absorptive base impregnated with a composition including chlorinated rubber and a resin.

11. A box toe for shoes comprising an absorptive base impregnated with a composition including chlorinated rubber, a resin and a plasticizer.

12. A box toe for shoes comprising a felt impregnated with a composition including a chlorine-containing rubber compound having a viscosity characteristic within about the range 30–1000 centipoises in 20% solution in toluol and having a chlorine content within about the range 40–75% and a resin.

13. A box toe for shoes comprising an absorptive base impregnated with a composition including chlorinated rubber and a synthetic resin.

14. A box toe for shoes comprising an absorptive base impregnated with a composition including chlorinated rubber, a synthetic resin and a plasticizer.

15. A box toe for shoes comprising an absorptive base impregnated with a composition including chlorinated rubber and rosin.

16. A box toe for shoes comprising an absorptive base impregnated with a composition including chlorinated rubber, rosin and a plasticizer.

17. A box toe for shoes comprising an absorptive base impregnated with a composition including chlorinated rubber and hydrogenated rosin.

18. A box toe for shoes comprising an absorptive base impregnated with a composition including chlorinated rubber, hydrogenated rosin and a plasticizer.

19. A box toe for shoes comprising an absorptive base impregnated with a composition including chlorinated rubber and ester gum.

20. A box toe for shoes comprising an absorptive base impregnated with a composition including chlorinated rubber, ester gum and a plasticizer.

21. A box toe for shoes comprising an absorptive base impregnated with a composition including chlorinated rubber and hydrogenated ester gum.

22. A box toe for shoes comprising an absorptive base impregnated with a composition including chlorinated rubber, hydrogenated ester gum and a plasticizer.

23. A box toe for shoes comprising an absorptive base impregnated with a composition including chlorinated rubber and a resin in amount within the range 10%–70% by weight of the non-volatile constituents of the composition.

24. A box toe for shoes comprising an absorptive base impregnated with a composition including chlorinated rubber and rosin in amount within the range 10%–70% by weight of the non-volatile constituents of the composition.

25. A box toe for shoes comprising an absorptive base impregnated with a composition including chlorinated rubber, a resin and a plasticizer selected from the group consisting of castor oil, dibutyl phthalate, tricresyl phosphate, ethyl and methyl abietates, hydrogenated ethyl and methyl abietates, pine oil foots and polymerized terpenes.

WILLIAM W. DE LANEY.